Oct. 12, 1943.                G. P. MARCY                2,331,408
                            CONTROL APPARATUS
                          Filed Jan. 18, 1941          2 Sheets-Sheet 1

WITNESSES:                                        INVENTOR
                                              GERALD P. MARCY
                                              BY
                                                 ATTORNEY

Oct. 12, 1943.  G. P. MARCY  2,331,408
CONTROL APPARATUS
Filed Jan. 18, 1941  2 Sheets-Sheet 2

WITNESSES:

INVENTOR
GERALD P. MARCY.
BY
ATTORNEY

Patented Oct. 12, 1943

2,331,408

UNITED STATES PATENT OFFICE 2,331,408

CONTROL APPARATUS

Gerald P. Marcy, Longmeadow, Mass., assignor to Westinghouse Electric & Manufacturing Company, East Pittsburgh, Pa., a corporation of Pennsylvania Application January 18, 1941, Serial No. 374,997

7 Claims. (Cl. 200—139)

This invention relates to control apparatus and more especially to thermostatically-controlled switches adapted for use in refrigerating apparatus.

Thermostatic switches adapted for controlling electric circuits which include an inductive load require a snap-acting opening movement of the switch to prevent excessive arcing. A certain amount of power is required to actuate the snap-acting device associated with such switches which power is generated by the temperature-responsive element passing through a certain temperature range. This temperature range is known as the temperature differential of the thermostatic switch. It is usually desirable to have the temperature differential as small as possible in order to maintain the temperature of the media being controlled within close limits. This, heretofore, either required a large temperature-responsive element or a delicate snap-acting mechanism, both of which are expensive.

It is accordingly an object of the invention to provide a snap-acting thermostatically-controlled switch which operates on a small temperature differential and is of simple and rugged construction.

Another object of the invention is to provide novel means for locking the thermostatically-controlled contacts in the open and closed position.

These and other objects are effected by my invention as will be apparent from the following description and claims taken in connection with the accompanying drawings, forming a part of this application, in which:

Figure 1:
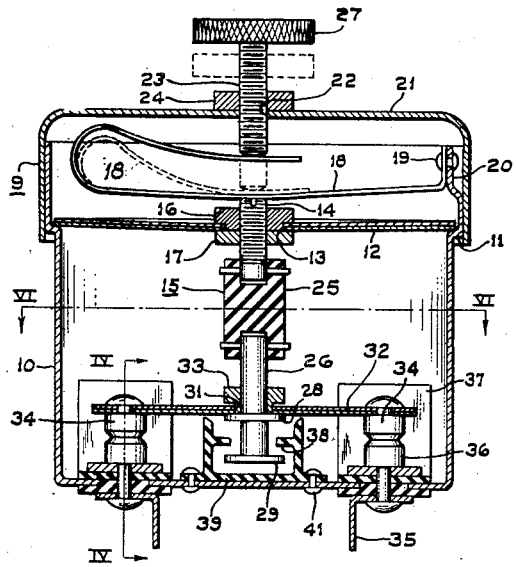
Fig. 1 is a section of the thermostatic switch of this invention, the contacts being shown in the closed position by the full lines and shown locked in the closed position by the dotted lines.

Referring now to the drawings in detail, a thermostatic control switch, designated by numeral 9, embodies a cup-shaped container 10, the upper portion of which is enlarged to provide a shoulder 11 upon which the edge of a bimetallic disc 12 rests. The bimetallic disc 12 is slightly dished to provide a snap-acting movement of the central portion thereof, the movement being downwardly when the temperature increases above a predetermined point. The disc tends to snap upwardly when the temperature decreases below said predetermined point by an amount equal to the temperature differential of the disc. The central portion of the disc 12 is provided with an opening 13 through which upper portion 14 of an actuating rod 15 extends, which portion 14 is threaded and secured in the opening 13 by a necked nut 16 and by a lock nut 17.

The disc 12 is retained on the shoulders 11 by a generally U-shaped spring 18, one end of which is secured by a rivet 19 to an indented portion 20 in the lip of the cup 10. The cup is closed by a cover 21 having a central opening 22 through which the threaded shaft 23 of an adjusting screw 27 extends. The threads of the shaft 23 engage the threads of a nut 24 secured to the top wall of the cover 21 adjacent the opening 22. The lower end of the shaft 23 bears against one end of the spring 18 and is located directly above the actuating rod 15.

The function of the spring 18 is to vary the temperature characteristics of the bimetallic disc 12. An increase in the pressure of the spring 18 on the upper portion of the actuating rod 14, such as may be effected by screwing the adjusting screw 27 downwardly reacts on the disc 21, causing it to snap upwardly or downwardly at a lower temperature than formerly.

The actuating rod 15 comprises a central portion 25 of insulating material, and a lower portion 26 of metal on which two spaced-apart collars 28 and 29 are formed. Both the upper portion 14 and the lower portion 26 are rigidly secured to the central portion 25 by a mortise and pin joint. The lower portion 26 of the actuating rod 15 passes through a central opening 31 of a bimetallic strip 32, which strip is clamped between the collar 28 and a ring 33 pressed on the shaft. The bimetallic strip 32 is adapted to flex upwardly at its center when heated.

Figure 2:
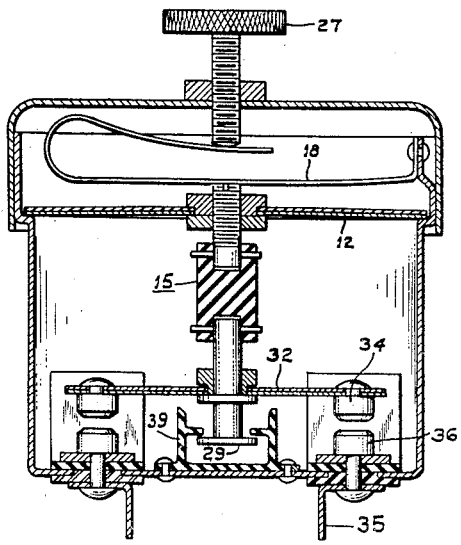
Fig. 2 is a section of the thermostatic switch of this invention with the contacts in the open position.

An electric contact button 34 is affixed to each end of the bimetallic strip 32 and said contact buttons 34, respectively, engage a second pair of contact buttons 36 secured in, but insulated from the base of the cup 10 and in electrical connection with insulated lugs 35 on the outer side of the casing 10. The contacts 34 are maintained in a position above the contacts 36 by guides 37 of insulating material adjacent the ends of the bimetallic strip 32. The upward travel of the actuating rod 15 is limited by stops 38 projecting inwardly from a U-shaped section of molded electrical insulating material 39 secured by rivets 41 to the base of the cup 10 which stops 38 engage the lower collar 29. As shown in Fig. 1, the bimetallic disc 12 closes the contacts 34 and 36 when the disc 12 snaps downwardly and, as shown in Fig. 2, opens them when the disc 12 snaps upwardly.

When the adjusting screw 27 is turned downwardly to the point where the free end of the spring 18 touches the portion of said spring 18 immediately below it, the contacts 37 are forced to and locked in the closed position against contacts 36. This position is illustrated by the dotted lines of Fig. 1. The U-shaped configuration of the spring 18 thus affords a resilient body between the shaft 23 of the thumb screw 27 and the operating rod 15 for a limited displacement which body thereafter becomes rigid.

Figures 3, 4:
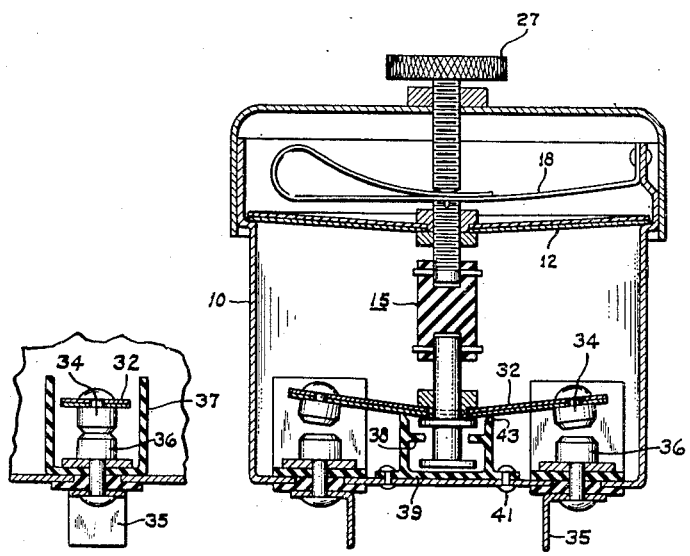
Fig. 3 is a section of the thermostatic switch showing the contacts locked in the open position.
Fig. 4 is a sectional view on the line IV—IV of Fig. 1.
Figure 5:
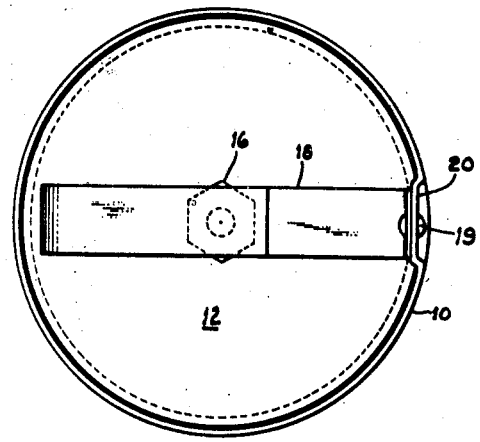
Fig. 5 is a plan view of the thermostatic switch with the cover removed.
Figure 6:
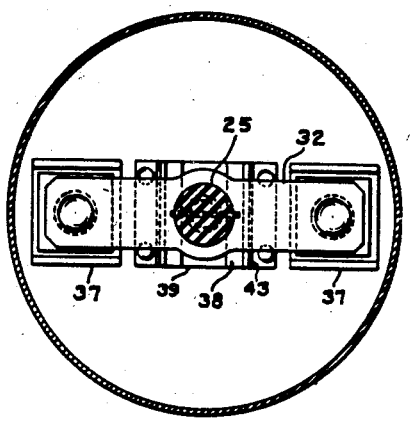
Fig. 6 is a sectional view on the line VI—VI of Fig. 1.

The adjusting screw 27 also provides for forcibly opening the contacts 34, 36. As shown in Fig. 3, the upper edges 43 of the U-shaped insulating material 39 engage the bimetallic strip 32 at two points on opposite sides of the actuating rod 15 and between the contacts 34 when the adjusting screw 27 is screwed down to a position beyond that shown by the dotted lines of Fig. 1. The bimetallic strip 32 is flexible so that forcing the actuating rod 15 downward causes the portion of the strip 32 which lies between the two upper edges 43 of the insulating material to bend downwardly. This downward bending causes the ends of the strip 32 to pivot on the upper edges 43 of the insulating material 39 and raise the ends of the strip 32 and the contacts 34 thereon. This action separates the contacts 34 from the contacts 36.

Figure 7:
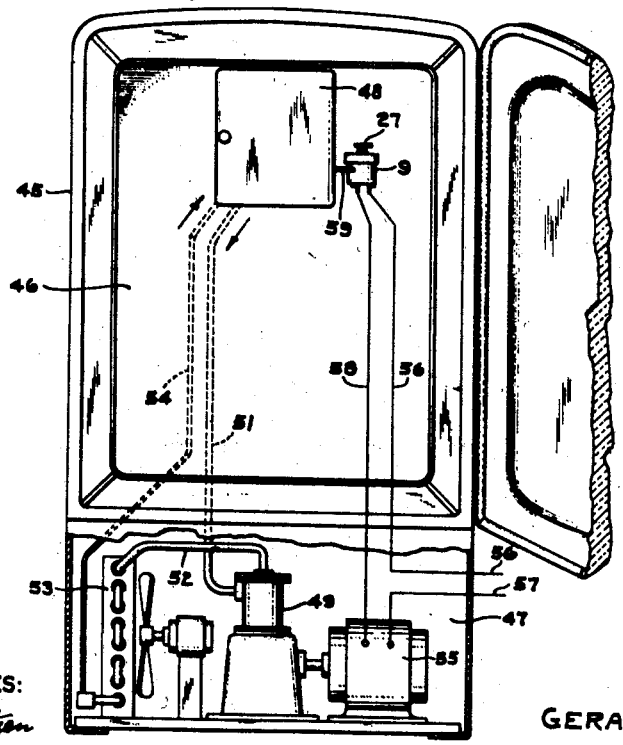
Fig. 7 is a view of the thermostatic switch of this invention installed in a domestic refrigerator to control the refrigerating apparatus thereof, the bottom of the refrigerator being broken away.

The control of this invention is adapted to regulate refrigerating apparatus and its installation in such apparatus is shown in Fig. 7 in which the reference numeral 45 designates a refrigerator cabinet having an insulated food compartment 46 in the upper portion thereof and a machine compartment 47 in its lower portion. An evaporator 48 is located in the upper portion of the food compartment and is connected with a compressor 49 by a suction conduit 51. The compressor 49 removes the refrigerant vapor from the evaporator 48, compresses the vapor and forces the compressed vapor through a tube 52 into a condenser 53 wherein the refrigerant is cooled and liquefied. Liquefied refrigerant from the condenser 53 flows through a capillary flow-impeding tube 54 to the evaporator 48, wherein it vaporizes to cool the same and the vapor thereafter repeats the refrigerating cycle. The compressor is driven by an electric motor 55 which receives power from lines 56 and 57 through the thermostatic switch 9 and lead 58. The thermostatic control 9 of this invention is secured by a metallic heat-conducting strip 59 to the evaporator 48 to control its temperature and is connected in series with the line 56 and the lead 58.

Operation

The thermostatic control 9 in the refrigerating cabinet 45 operates as follows: Assume that the food compartment has been refrigerated to the proper temperature and that the bimetallic disc 12 is in the upper position and the contacts 34, 36 are separated as shown in Fig. 2. A continuous heat leakage takes places through the walls of the food compartment 46 which leakage gradually raises the temperatures of the evaporator 48 and disc 12. When the temperature of the disc 12 reaches a predetermined point it will snap downwardly and move contacts 34, 36 to the closed position shown in Fig. 1. The closing of the contacts 34, 36 establishes an electrical connection between lines 56 and 58 and starts the operation of the refrigerating apparatus so that refrigerant is supplied to the evaporator 48.

The path of the current from one of the contacts 36 to the other contact 36 is through the bimetallic strip 32 which strip is heated by the current. The heating of the strip 32 tends to cause it to deflect upwardly at its center and this tendency manifests itself mainly as an upwardly directed force on the actuating rod 15 and a downwardly directed force on the contact buttons 34. During this time, the bimetallic disc 12 is being cooled by the evaporator 48 and its resistance to upward flexing is thereby constantly decreased until the upwardly directed force of the bimetallic strip 32 on the actuating rod 15 overcomes both the deflecting resistance of the disc and the pressure of the spring 18 and causes the central portion of the disc 12 to snap upwardly. This upward movement occurs at a higher temperatre than would be the case if the strip 32 did not exert an upwardly directed force. The upward movement of the disc 12 raises the operating rod 15, the bimetallic strip 32, and the contacts 34 and interrupts the current to the motor 55 and through the strip 32 whereupon the refrigerating apparatus ceases to operate and the strip 32 cools to its former temperature. The action of strip 32 thus decreases the temperature differential of the switch below that normally possessed by the disc 12 by increasing the temperature at which the contacts 36, 37 are opened, while the temperature at which said contacts 36, 37 are closed is not affected. The temperature of the evaporator 48 is therefore controlled between narrow limits without sacrifice in the size or in the ruggedness of construction of the thermostatic control switch 9.

If it is desired to maintain a maximum degree of refrigeration such as when it is desired to freeze desserts or other comestibles in the evaporator 48, the adjusting screw 27 is turned downwardly to the position shown in the dotted lines of Fig. 1. When thus screwed down the bimetallic disc 12 and both contacts 34 are forced into the lower position, if not already in said position, and the contacts 34 are locked adjacent the contacts 36 so that the bimetalic disc 12 is powerless to open them. It will be obvious that in this position of the adjusting screw 27, the refrigerating apparatus will run continuously.

The contacts 34, 36 may also be locked in the open position which position is utilized when defrosting the evaporator 48 or for permanently rendering the refrigerating apparatus 49, 53 inoperative. This is effected by turning the adjusting screw 27 to the position shown by Fig. 3. When moved into this position the upper edges 43 of the insulating material 39 engages the bimetallic strip 32 and causes it to flex at its securement to the actuating rod 15 and raise the extremities of the bimetallic strip 32 as the adjusting screw is turned down so that the contacts 34 are raised from the contacts 36. When in this position, the bimetallic disc 12 is powerless to close the contacts 34, 36 and the refrigerating apparatus remains inoperative.

It will be apparent from the above description that this invention provides a thermostatic control switch adapted for use in refrigerating apparatus which switch has a small temperature differential and is of simple and rugged construction. The invention also provides means for locking the contacts of the switch in either the open or the closed positions.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. In a thermostatic switch, the combination of electric contacts, a snap-acting, bimetallic element adapted to move selectively to two positions in response to changes in temperature, means for interconnecting said bimetallic element and said contacts to open the same when said bimetallic element is in one of said positions and to close said contacts when the bimetallic element is in the other of said positions, said interconnecting means including a second bimetallic element adapted when heated to bias said snap-acting element toward the contact-opening position, and means for heating said second bimetallic element only when said contacts are closed, whereby the temperature differential at which said first-named bimetallic element opens and closes said contacts is decreased.

2. In a thermostat, the combination of electrical contacts, means effective to open and close said contacts, a snap-acting bimetallic element for actuating said means to fully open and fully close said contacts by selectively assuming contact-opening and contact-closing positions in response to changes in temperature, said means including a second bimetallic element adapted when heated to bias said snap-acting bimetallic element toward one of said positions, and means for heating said second bimetallic element only when said snap-acting bimetallic element is in the other of said positions.

3. In a thermostat, the combination of electrical contacts, means for opening and closing said contacts, a snap-acting bimetallic element for actuating said means by selectively assuming contact-opening and contact-closing positions in response to changes in temperature, said means including a second bimetallic element adapted when heated to bias said snap-acting bimetallic element toward one of said positions, and means for heating said second bimetallic element only when said snap-acting element is in the other of said positions, said second bimetallic element being adapted for creep-type action.

4. In a thermostat, the combination of electrical contacts, means for opening and closing said contacts, a snap-acting bimetallic element for actuating said means by selectively assuming contact-opening and contact-closing positions in response to changes in temperature, said means including a second bimetallic element adapted when heated to bias said snap-acting bimetallic element toward the contact-opening position, and means for heating said last-named bimetallic element only when said contacts are closed.

5. In a thermostat, the combination of a bimetallic element adapted to snap to one position when the temperature of the element decreases to a predetermined point and to snap to a second position when said temperature increases to a second point above said predetermined point, electric contacts, interconnecting means secured to said element and to one of said contacts to open said contacts when said element snaps to said one position and close said contacts when said element snaps to said second position, said interconnecting means including a flexible portion, a stop engageable by a part of said interconnecting means, said part being located between the flexible portion and the contact secured to the interconnecting means, said stop being positioned for engagement by said interconnecting means when said interconnecting means is moved beyond its contact-closing position, and means for selectively biasing said element toward and retaining the same in said second position, said last-named means also being adapted to move said element beyond said second position to effect engagement of said interconnecting means with said stop to open said contacts.

6. In a thermostatic switch, the combination of two electrical contacts at least one of which is movable, a temperature-responsive element, connecting means between said temperature-responsive element and said movable contact to move said movable contact to open and closed positions with respect to the other contact, said connecting means including a flexible portion, adjustable means including said connecting means for forcibly moving said movable contact to one of said positions against the action of said temperature-responsive element, and a stop engaged by said connecting means when said connecting means is moved beyond a position normally effective to move said movable contact to one of said positions, said stop, when so engaged, deflecting the flexible portion of said connecting means to move said movable contact to the other of said positions.

7. In a thermostatic switch, the combination of a fixed contact, a temperature-responsive element, a member having a flexible connection with said element and adapted to be moved thereby, a movable contact on said member adapted to engage and establish an electrical connection with said fixed contact when said member is moved to a predetermined position by said temperature-responsive element, and a fixed stop adapted to be engaged by said member when moved to a predetermined position, said stop causing said flexible connection to move said member to separate the movable contact from the fixed contact when said member is moved beyond said predetermined position.

GERALD P. MARCY.